UNITED STATES PATENT OFFICE.

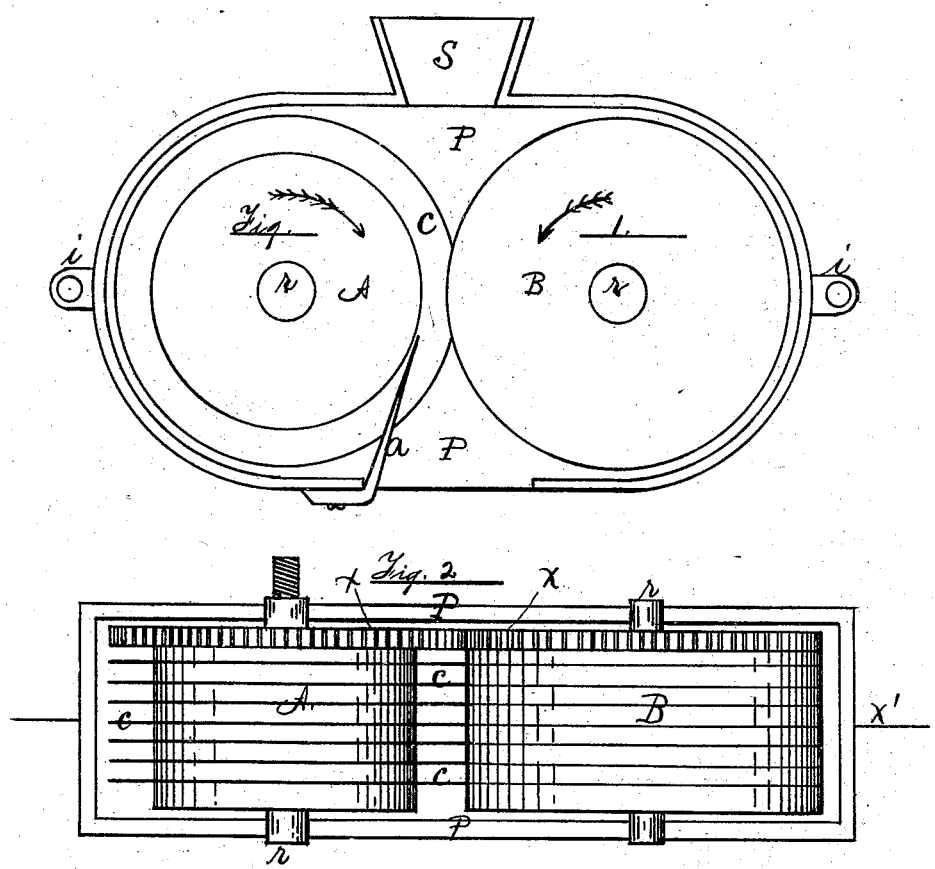

WILLIAM REITZ AND EMIL EICHHOLZER, OF JOLIET, ILLINOIS.

IMPROVEMENT IN VEGETABLE-CUTTERS.

Specification forming part of Letters Patent No. 187,731, dated February 27, 1877; application filed August 19, 1876.

*To all whom it may concern:*

Be it known that we, WILLIAM REITZ and EMIL EICHHOLZER, of the city of Joliet, in Will county, and State of Illinois, have invented certain Improvements in Vegetable-Cutters, of which the following is a specification, reference being had to the annexed drawing, in which—

Figure 1 is a vertical sectional view, and Fig. 2 a plan view, on the top of the cutting-rollers.

The nature of our invention consists in an arrangement of a cutting-roller with a wooden roller, between which vegetables or any other thing desirable may be run through between to be cut into strips or pieces.

In the drawing, P represents a case, preferably constructed of metal, which contains the rollers A and B, which turn in the direction of the arrows on their journals r. The roller A is provided with a series of annular cutting-knives, c, which bear against the opposite wooden or soft roller B.

The substance to be cut enters at the hopper s, and passes down between the rollers A B, where it is cut by the knives c, and is discharged below.

The whole device is calculated to be screwed to the edge of a table by a thumb-screw.

a is a guard, to bring the substance cut out from between the knives, so it will discharge below. The two rollers A B are caused to rotate at the same velocity by means of gearing x, inclosed with the rollers in the case.

The whole is propelled by a crank fastened to one of the shafts r. The two halves of the case P are united by ears i, at each end, through which bolts pass.

The device makes a very efficient machine to cut up vegetables, meats, &c.

Having thus described our invention, what we claim as new, and desire to secure by Letters Patent, is as follows:

The case P, having inclosed within it the rollers A B, knives c, and guard a, and gearing x, all arranged, operating, and constructed particularly as and for the purpose set forth.

WILLIAM REITZ.
EMIL EICHHOLZER.

Witnesses:
THOS. H. HUTCHINS,
ISAAC J. VAN RIPER.